March 19, 1929.　　F. DUSTAN ET AL　　1,705,967
DRIVER OF THE CRANK PIN TYPE
Filed July 2, 1927　　2 Sheets-Sheet 1

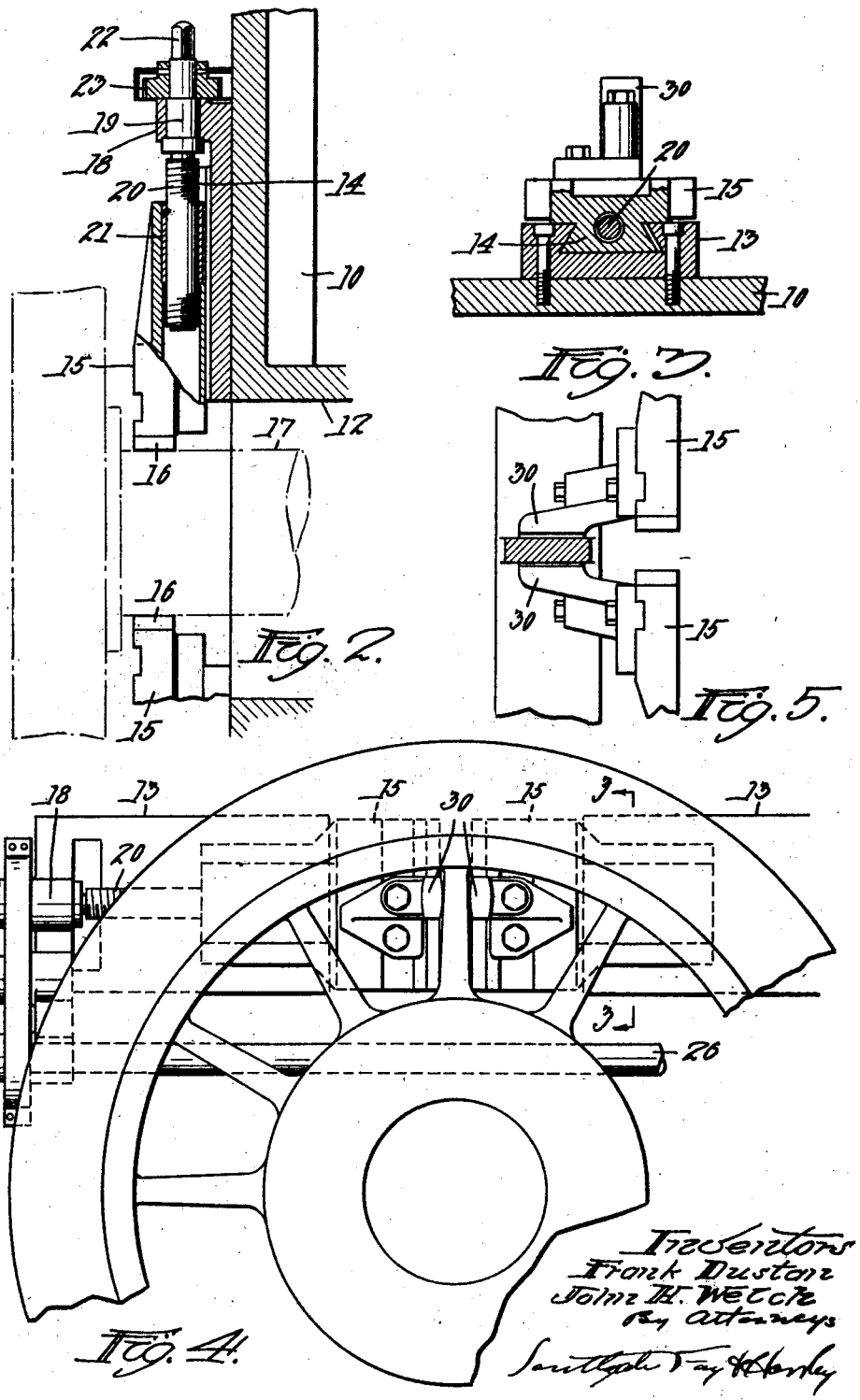

Patented Mar. 19, 1929.

1,705,967

UNITED STATES PATENT OFFICE.

FRANK DUSTAN AND JOHN H. WELCH, OF FITCHBURG, MASSACHUSETTS, ASSIGNORS, BY MESNE ASSIGNMENTS, TO SHAW CRANE-PUTNAM MACHINE COMPANY, INC., A CORPORATION OF DELAWARE.

DRIVER OF THE CRANK-PIN TYPE.

Application filed July 2, 1927. Serial No. 203,064.

Although the principles of this invention are capable of more general use, the invention is particularly adapted and designed for the driving of locomotive wheel sets and trailer sets to finish the surfaces, both in manufacture and repair.

The principal objects of the invention are to provide an arrangement of this kind in which the jaws for driving the wheel sets will operate on the crankpins, which have finished surfaces, to insure that the wheel sets will be held exactly in the same position each time that they are handled in the lathe, so that the operator can establish locating points for the movable counterweights on the face plate to suit the various sizes of the wheel sets handles; to provide a construction for this purpose in which the jaws are very quickly and easily operated and from either the front or rear of the lathe and in which the jaws are held in such a way that they cannot become loosened by the shocks of starting or stopping the machine; and to provide for handling trailer sets on this driving device by the aid of a supplementary pair of extension jaws attached to the regular jaws and engaging a spoke of the wheel, as these extension jaws are attached to the regular jaws they are adjustable in the same way as the crankpin jaws and have the same advantages.

Other objects and advantages of the invention will appear hereinafter.

Reference is to be had to the accompanying drawings in which

Fig. 2 is a diametrical sectional view showing the manner in which the crankpin is grasped by the jaws;

Fig. 3 is a transverse sectional view on the line 3—3 of Fig. 4;

Fig. 4 is a view similar to Fig. 1 showing the addition of the extension jaws for operating on trailer sets, and Fig. 5 is a view similar to Fig. 2 showing these extension jaws in position.

Figure 1:
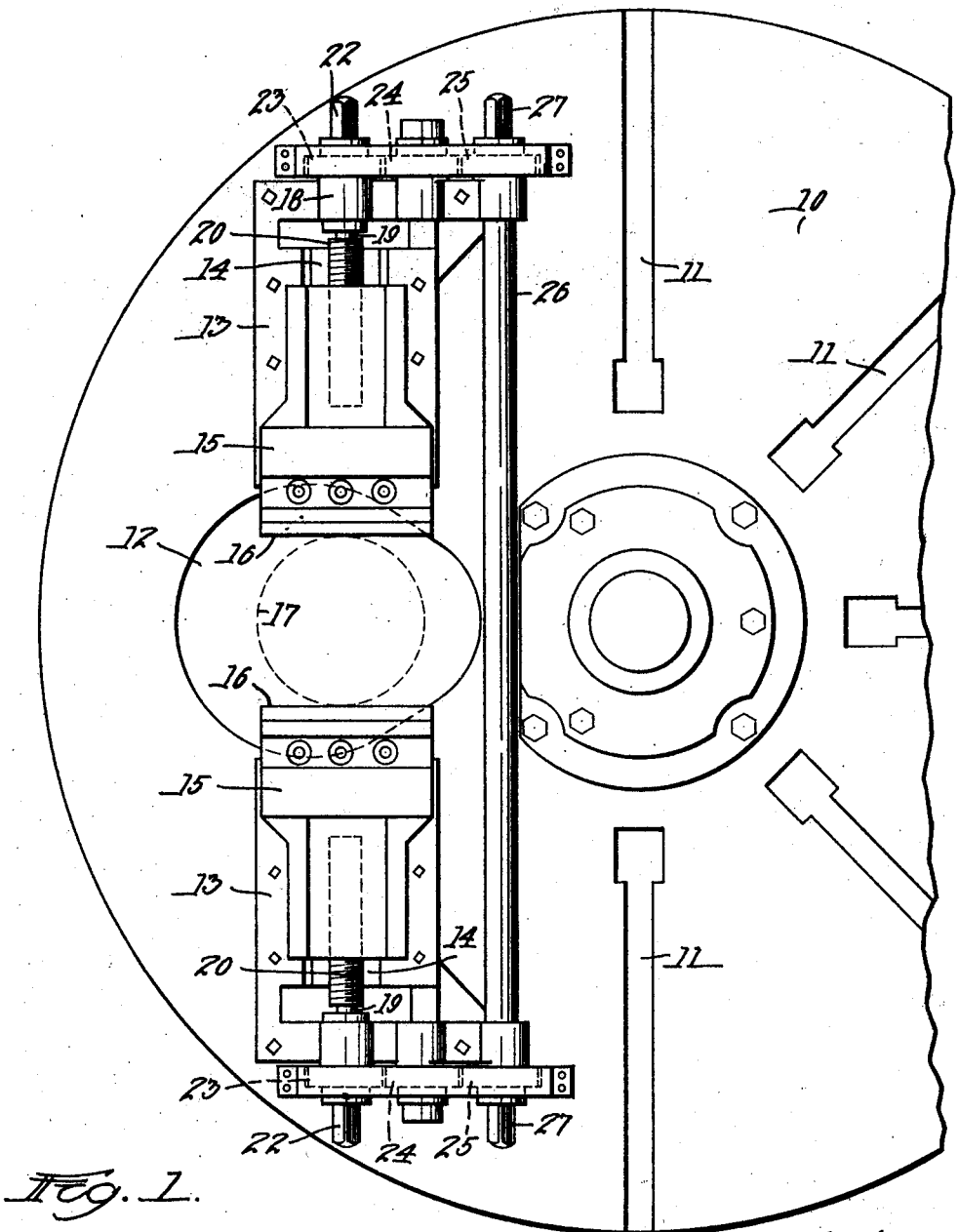
Fig. 1 is a front view of a face plate for a locomotive journal turning, quartering and pin turning lathe, showing a preferred embodiment of this invention.

It will be understood by those skilled in the art that the face plate 10 of a machine of the character described is provided with adjustable counterweights to balance the forces set up in turning a heavy wheel set. This invention is shown as applied to a face plate arranged for the application of these counterweights. The face plate is provided with an opening 12 located at a distance from the center. On opposite sides of it are mounted brackets 13 having guides 14 which are arranged centrally in alignment with each other and about centrally with respect to the opening 12. These guides carry slides 15 having dovetailed projections entering the guides. On each of these slides is a jaw 16, these jaws being adapted to engage a crankpin 17 on a locomotive wheel set projecting through the opening 12 to the inner side of the face plate. These jaws are faced with copper strips to avoid injuring the finished surface of the crankpin 17.

For the operation of each of these jaws, the brackets 13 are provided with bearings 18 in which are rotatably mounted a pair of shafts 19, each having a feed screw 20 thereon entering a nut 21 carried by the two slides 15. The ends of these shafts are squared off at 22 to receive a T handle socket wrench for operating them.

Obviously the axes of the two screws 20 are in the same line and in practically the center of the opening 12. Each of the two screws is provided with a gear 23 meshing with a gear 24 on a stud journalled in the bracket 13. The two gears 24 mesh with two gears 25 fixed to a shaft 26 arranged parallel with the two screws and extending across the face plate. The opposite ends of this shaft are mounted in bearings on the brackets and have square ends 27 for receiving the socket wrench as stated above. The two sets of gearing at the ends of this shaft are exactly alike so that turning of the shaft will result in the adjustment of the two jaws toward each other or away from each other exactly in synchronism and equal distances.

It will be seen that on account of the square ends 22 and 27, the jaws can be operated either from the rear or the front of the lathe without any danger of getting them out of center. On account of this feature, the wheel sets will be held in exactly the same position each time they are placed in the lathe. This is very important because it enables the operator to establish locating points for the movable counterweights to suit the various sizes of wheel sets handled. Also it will be observed that the adjustment for loosening and especially for binding up the jaws on the crank-pin is made very quickly and easily as there is only one adjustment to make. This is an important improvement over machines of this kind in which the jaws clamp on a spoke in the wheel center. Furthermore, on account of the fact that jaws are held by the screws 20 they cannot become loosened on account of any ordinary shocks set up in starting and stopping.

In handling trailer sets, the same mechanism is used and with the same advantages but a pair of extension jaws 30 are bolted to the slides 15 and engage a spoke in the wheel center as shown in Figs. 4 and 5. These extension jaws can be attached to the face of the regular jaws at various distances from the center of the lathe, to suit the various sizes of trailer wheel centers.

Although we have illustrated and described only one form of the invention and one attachment therefor, we are aware of the fact that modifications can be made therein by any person skilled in the art without departing from the scope of the invention as expressed in the claims. Therefore, we do not wish to be limited to all the details of construction herein shown and described, but what we do claim is:—

1. In a wheel lathe, the combination of a face plate having an excentric opening therethrough for the reception of the crank-pin, opposed jaws slidably mounted on the face plate on either side of said opening, a shaft mounted on the same side of the face plate as said jaws and parallel to the direction of movement of the same, screws for reciprocating the jaws, and gearing between said screws and said shaft.

2. In a wheel lathe, the combination of a face plate having an excentric opening therethrough for the reception of the crank-pin, opposed jaws carried by the face plate and slidable towards and away from said opening, screws for reciprocating said jaws, a shaft mounted on the face plate to one side of said opening and parallel to said screws, gearing between said shaft and said screws, and extensions carried by said jaws and passing through said opening.

In testimony whereof we have hereunto affixed our signatures.

FRANK DUSTAN
J. H. WELCH.